March 16, 1965  A. J. WATERMAN  3,174,059
BISTABLE CIRCUITS EMPLOYING CONTROLLED RECTIFIERS
Filed April 2, 1962
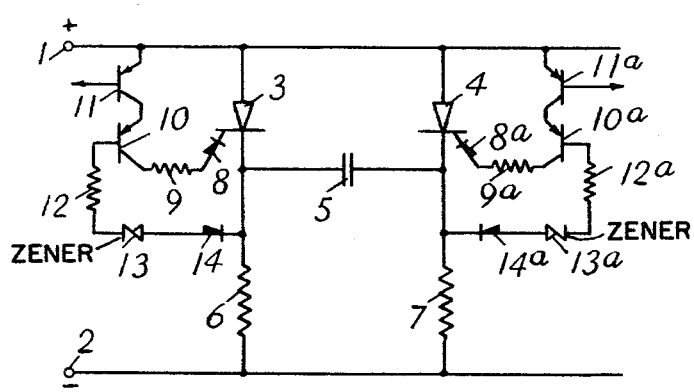

United States Patent Office 3,174,059
Patented Mar. 16, 1965

3,174,059
BISTABLE CIRCUITS EMPLOYING CONTROLLED RECTIFIERS
Anthony John Waterman, St. Albans, England, assignor to Rotax Limited, London, England
Filed Apr. 2, 1962, Ser. No. 184,192
Claims priority, application Great Britain, Apr. 17, 1961, 13,694/61
5 Claims. (Cl. 307—88.5)

This invention relates to circuit employing controlled rectifiers, and of the kind including first and second terminals which in use are of relatively positive and negative polarity respectively, first and second controlled rectifiers having their anodes connected to the first terminal and their cathodes connected to the second terminal, first and second loads in series with the first and second controlled, rectifiers respectively, and a capacitor connected between a point intermediate the first controlled rectifier and first load, and a point intermediate the second controlled rectifier and second load.

Such circuits are bi-stable, successive firings of the first and second controlled rectifiers serving to cause current to flow through the first and second loads respectively, and in addition serving to cut off the previously conducting controlled rectifier by virtue of the voltage developed across the capacitor. It will be apreciated that by varying the relative times for which the controlled rectifiers are conductive the circuit may be used as, for example, a voltage regulator. Thus, the first load may be a field winding of a generator, and the output from the generator can be controlled by controlling the time for which the first controlled rectifier is conductive. However, should the second controlled rectifier be fired before the capacitor is charged to a predetermined voltage the first controlled rectifier will not be cut off and both controlled rectifiers will conduct simultaneously.

The object of this invention is to overcome this difficulty in a convenient manner.

According to the invention, a circuit of the kind specified includes switch means which when either controlled rectifier is conducting prevents firing of the other controlled rectifier until the capacitor is charged to a predetermined voltage sufficient to switch off the conducting controlled rectifier when said other controlled rectifier is fired.

An example of the invention is illustrated diagrammatically in the accompanying drawing.

Referring to the drawing, there are provided first and second terminals 1, 2 adapted for connection to a source of direct or rectified alternating current so as to be of positive and negative polarity in use respectively. Connected to the terminal 1 are the anodes of first and second controlled rectifiers 3, 4 having their cathodes interconnected through a capacitor 5, the cathodes being connected in addition to the terminal 2 through first and second loads 6, 7 respectively.

The circuit thus far described is bi-stable. When the controlled rectifier 3 is conductive, the capacitor 5 is charged to substantially the supply voltage, and on firing the controlled rectifier 4 the voltage across the capacitor 5 serves to cut off the controlled rectifier 3.

In applying the invention to such a circuit, an exactly similar switch circuit is associated with each of the controlled rectifiers 3, 4. The circuit associated with the controlled rectifier 3 will be described, the other circuit being designated with the same reference numerals with the suffix *a*.

The gate of the controlled rectifier 3 is connected through a diode rectifier 8 and a resistor 9 in series to collector of a p-n-p type transistor 10 having its emitter connected to the collector of a second p-n-p type transistor 11. The base of the transistor 11 is adapted for connection to a source of pulses (not shown) for firing the controlled rectifier 3, and its emitter is connected to the terminal 1. The base of the transistor 10 is connected to the cathode of the controlled rectifier 3 through a resistor 12, a Zener diode 13 and a second diode rectifier 14.

The Zener diode 13 is chosen to be conductive only when the capacitor 5 is charged to a voltage sufficient to ensure cut off of the previously conducting controlled rectifier. Thus, a pulse applied to the base of the transistor 11 will cause firing of the controlled rectifier 3 only if the capacitor 5 is charged, since only in this case does current flow to the base of the transistor 10. The purpose of the rectifiers 8, 14 and resistors 9, 12 is to protect the controlled rectifier 3, the Zener diode 13 and the transistors 10, 11.

The source of pulses is arranged to supply pulses to the transistors 11, 11a successively. Moreover, the controlled rectifier 4 is prevented from being fired in a similar manner to the controlled rectifier 3 when the controlled rectifier 3 is conducting until the capacitor is charged to the voltage delivered by the Zener diode 13, 13a. In this case the capacitor is, of course, charged to the opposite polarity.

If desired the loads may be in the anode circuits of the controlled rectifiers, suitable modifications being made to the circuit.

Having thus described my invention what I claim as new and desire to secure by Letters Patent is:

1. A controlled rectifier circuit comprising in combination first and second terminals for connection to a D.C. source so as to be positive and negative in polarity respectively, first and second controlled rectifiers each having an anode, a cathode and a gate, each of said controlled rectifiers having its anode connected to the first terminal and its cathode connected to the second terminal and each controlled rectifier being capable of being switched on by pulses applied to its gate, first and second loads in the anode-cathode circuits of the first and second controlled rectifiers respectively, a capacitor having one side thereof connected to a point intermediate the first controlled rectifier and first load, and the other side thereof connected to a point intermediate the second controlled rectifier and load, said capacitor charging through the first controlled rectifier and second load when the first controlled rectifier conducts and discharging when the second controlled rectifier is switched on, said discharge switching off the first controlled rectifier, and said capacitor then charging through the second controlled rectifier and first load until the first controlled rectifier is switched on, when the capacitor discharges to switch off the second controlled rectifier, a first transistor through the emitter and collector of which pulses are applied to the gate of the second controlled rectifier to switch it on, said first transistor preventing switching on of the second controlled rectifier unless the first transistor is conducting, a first Zener diode connected between the base of the first transistor and a point intermediate the second controlled rectifier and second load, said Zener diode breaking down to permit conduction of the first transistor only when the first controlled rectifier is conducting and the voltage across said capacitor reaches a value sufficient to switch off the first controlled rectifier when the second controlled rectifier is rendered conductive, a second transistor through the emitter and collector of which pulses are applied to the gate of the first controlled rectifier to switch it on, said second transistor preventing switching on of the first controlled rectifier unless the second transistor is conducting, and a second Zener diode connected between the base of the second transistor and a point intermediate the first controlled rectifier and first load, said second Zener diode breaking down to permit conduction of the second transistor only when the second controlled rectifier is conducting and the voltage across the capacitor reaches a value sufficient to switch off the second controlled rectifier when the first controlled rectifier is rendered conductive.

2. A controlled rectifier circuit comprising in combination first and second terminals for connection to a D.C. source so as to be positive and negative in polarity respectively, first and second controlled rectifiers each having an anode, a cathode and a gate, each of said controlled rectifiers having its anode connected to the first terminal and its cathode connected to the second terminal and each controlled rectifier being capable of being switched on by pulses applied to its gate, first and second loads through which the cathodes of the first and second controlled rectifiers are connected to the second terminal, a capacitor having one side thereof connected to a point intermediate the first controlled rectifier and first load, and the other side thereof connected to a point intermediate the second controlled rectifier and load, said capacitor charging through the first controlled rectifier and second load when the first controlled rectifier conducts and discharging when the second controlled rectifier is switched on, said discharge switching off the first controlled rectifier, and said capacitor then charging through the second controlled rectifier and first load until the first controlled rectifier is switched on, when the capacitor discharges to switch off the second controlled rectifier, a first transistor through the emitter and collector of which pulses are applied to the gate of the second controlled rectifier to switch it on, said first transistor preventing switching on of the second controlled rectifier unless the first transistor is conducting, a first Zener diode connected between the base of the first transistor and a point intermediate the second controlled rectifier and second load, said Zener diode breaking down to permit conduction of the first transistor only when the first controlled rectifier is conducting and the voltage across said capacitor reaches a value sufficient to switch off the first controlled rectifier when the second controlled rectifier is rendered conductive, a second transistor through the emitter and collector of which pulses are applied to the gate of the first controlled rectifier to switch it on, said second transistor preventing switching on of the first controlled rectifier unless the second transistor is conducting, and a second Zener diode connected between the base of the second transistor and a point intermediate the first controlled rectifier and first load, said second Zener diode breaking down to permit conduction of the second transistor only when the second controlled rectifier is conducting and the voltage across the capacitor reaches a value sufficient to switch off the second controlled rectifier when the first controlled rectifier is rendered conductive.

3. A controlled rectifier circuit as claimed in claim 2 in which the first and second transistors have their collectors connected to the gates of the second and first controlled rectifiers respectively, the circuit further including a third transistor having its emitter connected to the first terminal and its collector connected to the emitter of the first transistor, pulses applied to the base of said third transistor switching on the second controlled rectifier provided that the first transistor is conductive, and a fourth transistor having its emitter connected to the first terminal and its collector connected to the emitter of the second transistor, pulses applied to the base of said fourth transistor switching on the first controlled rectifier provided that the second transistor is conductive.

4. A controlled rectifier circuit as claimed in claim 3 including a resistor and a diode in series in the collector circuit of the first transistor, and a further resistor and diode in series in the collector circuit of the second transistor.

5. A controlled rectifier circuit as claimed in claim 2 including a resistor and a diode in series in the base circuit of the first transistor, and a further resistor and diode in series in the base circuit of the second transistor.

References Cited by the Examiner
UNITED STATES PATENTS 2,487,510  11/49  Baker _____ 315—229 X
3,040,270  6/62   Gutzwiller _____ 307—88.5

JOHN W. HUCKERT, Primary Examiner.
ARTHUR GAUSS, Examiner.